(12) United States Patent
Baehrle-Miller et al.

(10) Patent No.: US 10,023,165 B2
(45) Date of Patent: Jul. 17, 2018

(54) METHOD AND DEVICE FOR OPERATING A BRAKE SYSTEM OF A VEHICLE, BRAKE SYSTEM

(71) Applicant: Robert Bosch GmbH, Stuttgart (DE)

(72) Inventors: Frank Baehrle-Miller, Schoenaich (DE); Lars Roters, Bietigheim-Bissingen (DE); Ulrike Schaefer, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 15/085,827

(22) Filed: Mar. 30, 2016

(65) Prior Publication Data

US 2016/0290425 A1 Oct. 6, 2016

(30) Foreign Application Priority Data

Apr. 2, 2015 (DE) .................. 10 2015 206 034

(51) Int. Cl.

| *F16D 125/40* | (2012.01) |
|---|---|
| *B60T 13/58* | (2006.01) |
| *B60T 13/74* | (2006.01) |
| *F16D 55/226* | (2006.01) |
| *F16D 65/18* | (2006.01) |
| *F16D 121/24* | (2012.01) |
| *F16D 121/04* | (2012.01) |

(52) U.S. Cl.
CPC .......... *B60T 13/588* (2013.01); *B60T 13/741* (2013.01); *F16D 55/226* (2013.01); *F16D 65/183* (2013.01); *F16D 2121/04* (2013.01); *F16D 2121/24* (2013.01); *F16D 2125/40* (2013.01)

(58) Field of Classification Search
CPC .... B60T 13/588; B60T 13/741; F16D 55/226; F16D 65/18; F16D 65/183; F16D 2121/04; F16D 2121/24; F16D 2125/40
USPC ................................................... 303/3
See application file for complete search history.

(56) References Cited

U.S. PATENT DOCUMENTS

| 5,704,693 | A | * | 1/1998 | Mackiewicz | ........... | B60T 13/22 |
|---|---|---|---|---|---|---|
| | | | | | | 303/15 |
| 8,521,388 | B2 | * | 8/2013 | Baehrle-Miller | ....... | B60T 7/042 |
| | | | | | | 701/70 |
| 8,938,347 | B2 | * | 1/2015 | Baehrle-Miller | ....... | B60T 7/107 |
| | | | | | | 701/70 |
| 9,031,756 | B2 | * | 5/2015 | Baehrle-Miller | ....... | B60T 7/042 |
| | | | | | | 701/70 |
| 9,068,613 | B2 | * | 6/2015 | Baehrle-Miller | ....... | F16D 65/18 |
| 9,108,599 | B2 | * | 8/2015 | Blattert | ............ | B60T 8/172 |
| 9,114,792 | B2 | * | 8/2015 | Bieltz | ............ | B60T 7/042 |

(Continued)

*Primary Examiner* — Thomas W Irvin

(74) *Attorney, Agent, or Firm* — Maginot, Moore & Beck LLP

(57) ABSTRACT

A method for operating a brake system of a vehicle, in particular a motor vehicle, including at least one wheel brake having a displaceable brake piston and an electric motor first actuator of a parking brake and a hydraulic second actuator of an operating brake for displacing the brake piston in each case. For operating the parking brake, the electric motor first actuator is activated in order to set a specifiable target clamping force of the wheel brake. If the maximum clamping force that is achievable by the electric motor first actuator is lower than the target clamping force, then the hydraulic second actuator is activated to provide an additional clamping force.

7 Claims, 1 Drawing Sheet

(56) References Cited

U.S. PATENT DOCUMENTS

| | | | | |
|---|---|---|---|---|
| 9,441,689 B2* | 9/2016 | Baehrle-Miller | ..... | B60T 13/588 |
| 9,457,774 B2* | 10/2016 | Knechtges | ............ | B60T 13/588 |
| 9,616,864 B2* | 4/2017 | Baehrle-Miller | ....... | B60T 8/172 |
| 9,643,586 B2* | 5/2017 | Blattert | ................ | B60T 13/746 |
| 9,725,077 B2* | 8/2017 | Blattert | .................... | B60T 8/17 |
| 2011/0224880 A1* | 9/2011 | Baehrle-Miller | ........ | B60T 7/042 |
| | | | | 701/70 |
| 2013/0001027 A1* | 1/2013 | Baehrle-Miller | ....... | F16D 65/18 |
| | | | | 188/106 F |
| 2013/0338896 A1* | 12/2013 | Baehrle-Miller | ....... | B60T 7/042 |
| | | | | 701/70 |
| 2014/0076674 A1* | 3/2014 | Baehrle-Miller | ..... | B60T 13/588 |
| | | | | 188/159 |
| 2015/0066324 A1* | 3/2015 | Baehrle-Miller | ..... | B60T 13/662 |
| | | | | 701/70 |
| 2015/0217738 A1* | 8/2015 | Blattert | ................ | B60T 13/662 |
| | | | | 701/70 |
| 2016/0375887 A1* | 12/2016 | Baehrle-Miller | ......... | B60T 7/12 |
| | | | | 303/15 |
| 2017/0066419 A1* | 3/2017 | Baehrle-Miller | ..... | B60T 13/588 |
| 2017/0097060 A1* | 4/2017 | Baehrle-Miller | ..... | B60T 13/741 |
| 2017/0190329 A1* | 7/2017 | Mannherz | ............. | B60T 13/741 |
| 2017/0217417 A1* | 8/2017 | Baehrle-Miller | ..... | B60T 13/662 |
| | | | | 303/3 |

* cited by examiner

METHOD AND DEVICE FOR OPERATING A BRAKE SYSTEM OF A VEHICLE, BRAKE SYSTEM

This application claims priority under 35 U.S.C. § 119 to patent application no. DE 10 2015 206 034.9, filed on Apr. 2, 2015 in Germany, the disclosure of which is incorporated herein by reference in its entirety.

The disclosure concerns a method and a device for operating a brake system of a vehicle, in particular a motor vehicle, comprising at least one wheel brake, wherein the wheel brake comprises a displaceable brake piston and an electric motor first actuator of a parking brake and a hydraulic second actuator of an operating brake for displacing the brake piston in each case, wherein for operating the parking brake the electric motor actuator is activated in order to set a specifiable target clamping force of the wheel brake.

The disclosure further concerns a suitable brake system.

BACKGROUND

Methods and devices of the aforementioned type are generally known from the prior art. By now, current motor vehicles frequently comprise wheel brakes comprising integrated parking brake functionality. For this the wheel brakes comprise, besides a conventional hydraulic actuator for displacing the brake piston, an electric motor actuator for displacing the same brake piston. Whereas the brake piston is operated hydraulically when operating the operating brake, the electric motor actuator is activated when operating the parking brake in order to set a high clamping force of the brake shoes of the wheel brake on a brake disk of the associated wheel of the motor vehicle. The use of the electric motor actuator for the functionality of the parking brake has the advantage that the parking brake is generally of a self-locking form, so that once the desired target clamping force has been achieved no further energy has to be expended in order to permanently maintain the clamping force.

SUMMARY

Owing to the method according to the disclosure, the advantage is achieved that even in the case in which the desired target clamping force cannot be provided by the electric motor actuator, for example because of insufficient available electrical energy, nevertheless a safe adjustment of the parking brake functionality is guaranteed. According to the disclosure, it is provided for this purpose that if the maximum clamping force achievable by the first electric motor actuator is lower than the target clamping force, the second actuator is activated to provide an additional clamping force. As a result, it is achieved that the electric motor actuator is hydraulically assisted, so that the target clamping force can be achieved or is achieved. By coordinated activation of the first and second actuators, the reliable achievement of the target clamping force is thus guaranteed, even if the first actuator alone would not be capable of doing so.

It is preferably provided that the first actuator, which is designed to be self-locking, is deactivated before the second actuator is activated. By the deactivation or the ending of the activation of the first actuator, the clamping force thereof remains available owing to the self-locking. The clamping force is then increased solely by the activation of the second actuator, whilst the first actuator guarantees that the provided clamping force is not reduced.

It is further preferably provided that the first actuator is activated again before the activation of the second actuator is ended. As a result, it is guaranteed that the operating force provided by the second actuator is maintained if the second actuator is deactivated or the activation thereof is ended. Owing to the reactivation of the first actuator, the same is moved on mechanically and matched to the position of the brake piston achieved by the second actuator, so that if the second actuator is deactivated, at least the self-locking of the first actuator prevents the hydraulically increased clamping force from being reduced again.

According to a preferred development of the disclosure, it is provided that the maximum achievable clamping force is determined as a function of a motor revolution rate of the first actuator and/or of a motor current of the first actuator. Especially during the activation of the first actuator, the motor revolution rate and/or the motor current of the first actuator is/are monitored, and in particular the revolution rate profile is observed. Here it is particularly preferably provided that the motor revolution rate and/or the motor current is/are compared with a respective limit value. It is in particular provided that if the motor revolution rate of the first actuator is lower, even before the target clamping force has been reached, it is recognized therefrom that the maximum achievable clamping force is lower than the target clamping force. Accordingly, the detected motor current is also compared with a defined limit value, and if the motor current exceeds the limit value before reaching the target clamping force, it is recognized therefrom that the achievable clamping force does not correspond to the target clamping force and is lower than the target clamping force. Furthermore, it is preferably provided that the motor current gradient is determined and compared with a defined threshold. If the increase in motor current before reaching the target clamping force is less than the defined threshold, then it is recognized therefrom that the maximum achievable clamping force lies below the target clamping force. It is further preferably provided that a current-time integral is formed as a function of the detected motor current and is compared with a defined maximum value. If the current-time integral exceeds the maximum value during the activation process before reaching the target clamping force, then likewise it is recognized therefrom that the achievable clamping force is lower than the target clamping force.

According to a preferred development of the disclosure, it is provided that the second actuator is activated in order to set a predetermined additional clamping force. In particular, it is provided that the second actuator is activated in order to provide a fixed set pressure value, in particular a hydraulic pressure value. The pressure value or the predetermined additional clamping force does not necessarily have to be related to the target clamping force. It is preferably provided that the pressure value or the additional clamping force that is to be set results in the desired target clamping force at least being achieved, preferably being exceeded. As a result, an adequate clamping force for holding the vehicle in the parked position is always guaranteed. As a result of predetermining the additional clamping force, it is provided that the additional clamping force is predetermined regardless of a difference between the target clamping force and the currently achievable clamping force. Thus an already predefined pressure level is demanded, regardless of how high the achievable clamping force is or how close the achievable clamping force lies to the target clamping force. As a result, a simpler and resource-saving operation of the wheel brake is achieved.

The clamping force is preferably predetermined depending on tolerances and/or free travel in the mechanical and/or hydraulic chain of action, at least one operating temperature, ageing and/or the efficiency of the first or second actuator. As a result, ageing effects, temperature influences or similar in the respective chains of action of the actuators are taken into account when presetting the pressure level or the clamping force.

According to a preferred development of the disclosure, it is provided that the activation of the second actuator is ended if the target clamping force is reached or exceeded, and/or if a target displacement distance of the brake piston has been detected. The second actuator is thus deactivated at the latest when the target clamping force has been reached or when the brake piston has overcome a predetermined target distance that guarantees reaching or exceeding the target clamping force. From said point in time when the first actuator has been activated again to reset the second actuator, no further energy has to be fed to the brake system.

The device according to the disclosure is characterized in that the controller is specially arranged to carry out the method according to the disclosure. As a result, the aforementioned advantages arise. Further features and advantages arise from the foregoing as well as from the claims.

The brake system according to the disclosure is characterized by the device according to the disclosure. As a result, the aforementioned advantages also arise. Further features and advantages arise from the foregoing as well as from the claims.

BRIEF DESCRIPTION OF THE DRAWINGS

The disclosure will be described in detail herein using the figures. In the figures.

DETAILED DESCRIPTION

Figure 1:
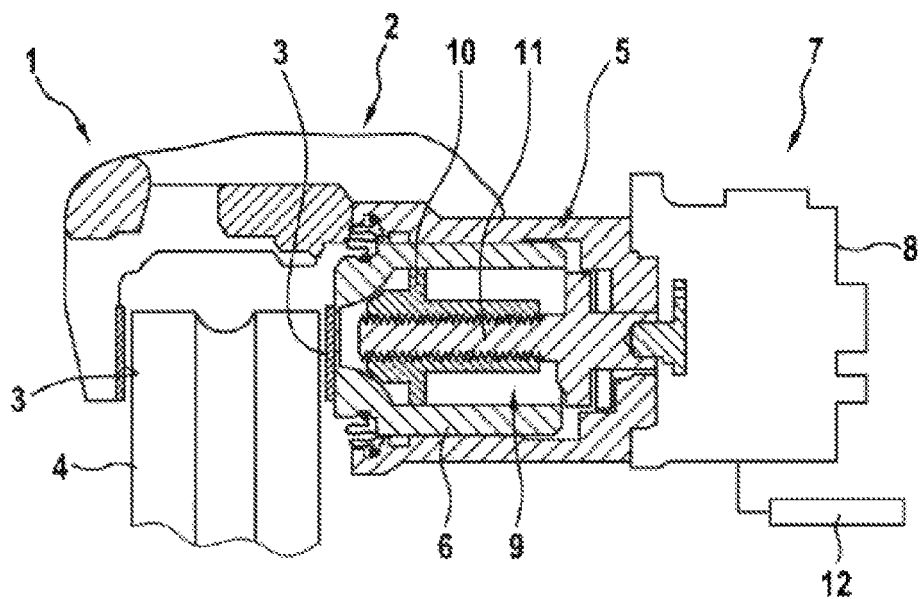
FIG. 1 shows a brake system of a motor vehicle in a simplified sectional representation.

FIG. 1 shows in a simplified representation a brake system of a vehicle comprising a wheel brake 1. The wheel brake 1 is in the form of a disk brake and comprises for this purpose a brake caliper 2 supporting the brake linings 3, between which a brake disk 4 that is rotationally fixedly connected to a wheel of the motor vehicle is clamped or jammed. The wheel brake 1 is in the form of an operating brake with an integral parking brake. For this purpose, the parking brake 1 comprises a hydraulic actuator 5 and an electric motor actuator 7, both of which are designed to displace a brake piston 6 to clamp the brake disk 4 between the brake linings 3.

The hydraulic actuator 5 comprises, as is usual, a pressure source and an actuatable valve (not shown here), wherein by operating the valve the pressure source can be connected to/disconnected from a hydraulic chamber that is closed on one side with/by the brake piston 6 in order to displace the brake piston 6 towards the brake disk 4 by the application of hydraulic pressure.

The electric motor actuator 7 comprises an activatable electric motor 8 as well as an actuator gearbox 9 with an actuator element 10. A drive shaft of the electric motor 8 is connected to the actuator gearbox 9. Said gearbox is in the form of a drive spindle 11 that is rotationally fixedly connected to the drive shaft and that comprises an external thread that works in conjunction with an external thread of the actuator element 10 that can be driven along the drive spindle 11. By activating the electric motor 8, the drive spindle 11 is set into a rotational displacement and so as to displace the actuator element 10, which is guided during this in the brake caliper 2 in the manner of a spindle nut so as to prevent rotation, along the drive spindle 11. During this the actuator element 10 can be displaced from a release position into a clamping position, in which the actuator element 10 forces the brake piston against the brake disk 4 and as a result clamps the brake caliper 2. The actuator element 10 is disposed coaxially relative to the brake piston 6 and within the brake piston 6 for this purpose. The hydraulic actuator 5 is usually activated during the operation of the motor vehicle to initiate and carry out braking processes, whereas the actuator 7 is used as a holding brake or parking brake. In this respect the wheel brake 1 corresponds to a conventional operating brake with an integral parking brake.

Figure 2:
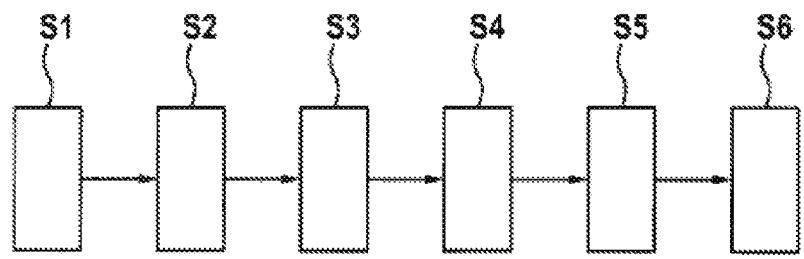
FIG. 2 shows a method for operating the brake system in a flow chart.

An advantageous method for operating the wheel brake 1 will be described below using FIG. 2. Initially the brake system is set into operation in a step S1. Using a sensor or other criteria, such as for example a detected stationary vehicle and an engine switch-off, a demand to the wheel brake 1 is generated that results or should result in the activation of the holding brake. In a step S2, following the detection of the demand the actuator 7 or the electric motor 8 is activated in order to displace the brake piston 6 into the clamping position. During this a switch-on peak of the motor current of the electric motor 8 can be detected. At the same time, the electric motor 8 accelerates. As the actuator element 10 has to initially come into contact with the brake piston 6 and subsequently the brake piston 6 must bring the brake linings into contact with the brake disk 4, a no-load operation of the actuator 7 initially takes place. The electric motor 8 is in this respect initially substantially operated in a no-load mode. The no-load mode is defined here by the required motor torque that is necessary to overcome the free travel or the free travels and to maintain the motor rotation for displacing the actuator element 10. After passing through all free travels, i.e. when a brake force can be applied by a further displacement of the actuator element 10, the clamping force is built up according to the further displacement of the spindle nut or of the actuator element 10 and the stiffness of the brake caliper 2.

At the start of deployment, it is moreover determined when the operation of the actuator 7 is to be stopped. In doing so a target clamping force is predetermined that should be reached by the activation of the actuator 7. During this, for example, depending on a current gradient of a highway on which the motor vehicle is standing, a target clamping force is defined or calculated that is sufficiently high to hold the motor vehicle permanently on the gradient. During, before and/or after the activation of the electric motor 8 it is determined what output torque of the electric motor 8 can be provided or what maximum clamping force can be achieved by means of the holding brake by the activation of the electric motor 8. The torque of the electric motor is converted by means of the actuator gearbox 9 into a translational force, which is then available as a clamping force between the linings 3 and the brake disk 4. In the normal case the actuation is stopped if the target clamping force is achieved by the adjusted clamping force.

In this respect, in a following step S3 it is initially checked whether the maximum achievable clamping force corresponds to or exceeds the target clamping force. Under certain conditions, for example in the case of an already highly warmed up electric motor 8, a low on-board electrical supply voltage for the electric motor 8, increased contact resistances in the cable loom or in the leads or owing to a combination of a plurality of the mentioned states, it can happen that the torque that can be delivered by the electric motor is not adequate to achieve the target clamping force. This is presently detected by one or more of the following criteria being fulfilled in the case in which the target clamping force has not yet been achieved:

a) The current motor revolution rate of the electric motor 8 falls below a predefinable limit value.

b) The current motor current of the electric motor 8 exceeds a predefinable limit value.

c) The rise of the motor current falls below a specifiable threshold.

The motor revolution rate and/or the motor current are thus monitored in order to detect therefrom whether the maximum achievable clamping force corresponds to or is lower than the target clamping force. If it is determined that the target clamping force cannot be achieved with the maximum achievable clamping force, then in a subsequent step S4 the actuator 7 for providing a hydraulic pressure is activated. Next the actuator 7 is deactivated. Owing to the advantageous actuator gearbox 9, which is designed to be self-locking, the brake piston 6 remains in the position set by the actuator 7. This means that the clamping force provided up to this point in time also continues to be effective. In particular owing to a demand by the holding brake or parking brake, a demand is now placed on the actuator 5 to provide a predefined hydraulic pressure or a predefined brake force. For this it is provided that a predefined pressure level or a predefined brake force or additional clamping force is demanded. In doing so, tolerances that arise from the electromechanical or hydraulic chain of action are taken into account, wherein measurement errors, ageing, version scatter, efficiencies, temperature effect, minimum guaranteed voltage in the functional range of the actuator 7 or similar are taken into account. The brake piston geometry is also preferably taken into account. Typical values can for example be 45 bar for the electromechanical chain of the actuator 7 and 15 bar for the hydraulic chain of action. Thus a target pressure of 60 bar would always be able to be set regardless of how much clamping force is lacking to achieve the target clamping force. Depending on the electromechanical actuator 5 or the quality of control of the hydraulic system, a target pressure of 30 bar or 100 bar can also be necessary or possible.

Following a waiting time until the hydraulic pressure is provided, the actuator 7 is re-activated in a following step S5. Thus the hydraulic and the electromechanical clamping forces are now superimposed. The hydraulic pressure supply is only ended in a step S6 if the mechanical force provision, i.e. the activation of the electric motor actuator 7, has already finished. Otherwise the electric motor actuator 7 would have to again fully provide the entire output torque to achieve the target clamping force and would have to operate with the output torque thereof in opposition to the already preloaded system, without a further increase in force being able to occur. Different criteria are advantageously used as the switch-off criterion: firstly, depending on the necessary additional clamping force and the provided clamping force of the actuator 7 as well as the stiffness of the jaws and the stiffness of the brake caliper 2, a distance can be determined that still has to be travelled by the brake piston 6 in order to achieve the target clamping force. Furthermore, additionally or alternatively, the activation can be terminated if one of the thresholds or limit values defined above as a function of motor revolution rate and motor current is achieved. Thus, the tolerances of the determined jaw stiffness or travel estimate are masked or ineffective.

If a re-clamping process is necessary in order to retrospectively increase the clamping force, then it is advantageous to proceed again according to steps S2 through S6 in order to re-clamp the wheel brake 1.

The method described is preferably carried out by the controller 12, which is specially designed for this purpose and which activates the actuators 5 and 7 accordingly.

What is claimed is:

1. A method for operating a brake system of a vehicle including at least one wheel brake having a displaceable brake piston, an electric motor first actuator of a parking brake for displacing the brake piston, and a hydraulic second actuator of an operating brake for displacing the brake piston, the method comprising:

activating the electric motor first actuator to operate the parking brake in order to set a specifiable target clamping force of the wheel brake; and activating the hydraulic second actuator if the maximum clamping force that is achievable by the electric motor first actuator is lower than the target clamping force in order to provide an additional clamping force, wherein activating the hydraulic second actuator includes deactivating the electric motor first actuator, which is configured to be self-locking, before the hydraulic second actuator is activated, and wherein activating the hydraulic second actuator further includes re-activating the electric motor first actuator before the activation of the hydraulic second actuator is ended.

2. The method according to claim 1, further comprising: determining the maximum achievable clamping force as a function of at least one of a motor revolution rate, a motor current, and a motor current gradient of the electric motor first actuator.

3. The method according to claim 1, further comprising: activating the hydraulic second actuator in order to set a predetermined additional clamping force.

4. The method according to claim 3, wherein the additional clamping force is predetermined depending on tolerances and/or free travel in the mechanical and/or hydraulic chain of action of the first or of the second actuator, an operating temperature, ageing and/or the efficiency of at least one of the actuators.

5. The method according to claim 1, further comprising: ending the activation of the hydraulic second actuator if the target clamping force is reached or exceeded by the clamping force and/or the additional clamping force and/or if a predefinable target displacement distance of the brake piston has been reached.

6. A device for operating a brake system of a vehicle including at least one wheel brake having a displaceable brake piston, an electric motor first actuator of a parking brake for displacing the brake piston, and a hydraulic second actuator of an operating brake for displacing the brake piston, the device comprising:

a controller configured to activate the electric motor first actuator in order to set a specifiable target clamping force of the wheel brake to operate the parking brake, and to activate the hydraulic second actuator if the maximum clamping force that is achievable by the electric motor first actuator is lower than the target clamping force in order to provide an additional clamping force, wherein activating the hydraulic second actuator includes: a) deactivating the electric motor first actuator, which is configured to be self-locking, before the hydraulic second actuator is activated; and b) re-activating the electric motor first actuator before the activation of the hydraulic second actuator is ended.

7. A brake system of a vehicle, comprising:

at least one wheel brake including a displaceable brake piston, an electric motor first actuator of a parking brake for displacing the brake piston, and a hydraulic second actuator of an operating brake for displacing the brake piston; and a controller configured to activate the electric motor first actuator in order to set a specifiable target clamping force of the wheel brake to operate the parking brake, and to activate the hydraulic second actuator if the maximum clamping force that is achievable by the electric motor first actuator is lower than the target clamping force in order to provide an additional clamping force, wherein activating the hydraulic second actuator includes: a) deactivating the electric motor first actuator, which is configured to be self-locking, before the hydraulic second actuator is activated; and b) re-activating the electric motor first actuator before the activation of the hydraulic second actuator is ended.

* * * * *